United States Patent Office 2,964,549
Patented Dec. 13, 1960

2,964,549

ALKANOLAMINEALKANEPHOSPHONIC ACIDS AND DERIVATIVES THEREOF

William M. Ramsey, Downey, and Charles Kezerian, Los Angeles, Calif., assignors to Victor Chemical Works, Chicago Heights, Ill., a corporation of Illinois No Drawing. Filed June 16, 1958, Ser. No. 742,015

40 Claims. (Cl. 260—438)

This invention relates to alkanolaminealkanephosphonic acids and salts thereof, chelates of same, and methods of producing said acids and salts wherein said acids and salts have the general formula:

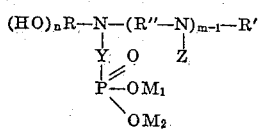

where $n$ is a number from 1 through 3, $m$ is an integer of 1 through 7, R is a lower alkyl group or poly(lower alkylene ether) group having terminal lower alkylene substituents, R'' is an alkylene group, Y is an alkylene and substituted alkylene group and R' and Z are selected from the group consisting of hydrogen, alkyl, aryl, $-R(OH)_n$ and

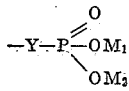

where $M_1$ and $M_2$ represent hydrogen and radicals which form salts therewith such as exemplified by metal cations.

Compounds of this type may be formed by the reaction of primary and secondary alkanolamines, polyalkanol primary and secondary amines, and primary and secondary alkanolpolyamines with haloalkanephosphonates in hot, alkaline, aqueous solution such as exemplified by the following general type reaction:

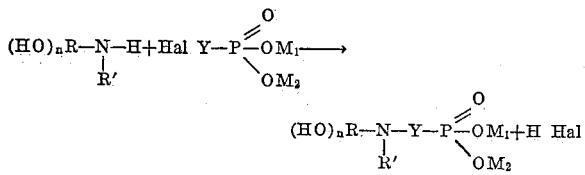

wherein Hal Y is a mono or polyhaloalkyl group or a mono or polyhalogenated substituted alkyl group, under alkaline conditions, which are necessary for efficiently carrying out the reaction. The reaction products are in the form of salts. Such salts may be converted to the free acids by further reaction with suitable strong inorganic acids, or ion exchange resins.

Some of the primary and secondary alkanolamines which may be used for the production of the compounds of this invention are:

Monoethanolamine
Diethanolamine
Phenyl-ethanolamine
Cyclohexanolamine
tris Methylolaminomethane
α-Methylbenzyl-ethanolamine
Di-isopropanolamine
Monobutanolamine
2-amino-2-methyl-propanediol-1,3
Dihydroxy-diethylenetriamine The above and similar primary and secondary amines react through the amino hydrogens with the halogen atoms of halogenated substituted alkylphosphonic acids, haloalkanephosphonic acids, or salts thereof to liberate hydrogen halide and form the compounds of this invention. The liberated hydrogen halides form base halides immediately from the bases employed in maintaining the alkalinity of the reaction mixtures.

Suitable haloalkanephosphonic acids include chloromethanephosphonic acids, β-chloroethylphosphonic acid, α,β-dichloroethylphosphonic acid, di- and trichloromethanephosphonic acids, bromomethanephosphonic acid, chloropropanephosphonic acid, and other haloalkanephosphonic acids, and salts thereof.

One or more or all of the hydrogen atoms on the nitrogen atoms in the alkanolamines shown above may be replaced with alkanephosphonic groups depending on the proportions of the alkanolamine and haloalkanephosphonic reactants employed in the above preferred method of making the products of this invention. In some instances the products may be made by reacting aminoalkanephosphonic compounds with a hydroxyalkyl halide or an alkylene oxide, but in this specification only the preferred method will be illustrated.

EXAMPLE 1

210 g. (2.0 moles) of diethanolamine was mixed with 100 ml. of water. To this mixture, portionwise, was added 260 g. (2.0 moles) of chloromethylphosphonic acid and 50% caustic soda solution. During this gradual addition the mixture was maintained alkaline to Nile blue indicator and the temperature was kept below 50° C.

The mixture was then heated up to the boiling point (under reflux) and an additional amount of 50% caustic soda solution was added (to maintain Nile blue alkalinity) to a total of 480 g. (6.0 moles). Heating at or very near the boiling point was continued for 20 hours; the reaction mixture was then cooled somewhat, diluted with enough water to dissolve precipitated sodium chloride, filtered while still warm (through glass wool) and allowed to cool overnight.

Then the crystalline product was filtered off and dried. Yield of crystals: 390 g. (crop I), after drying at 95° C.

Mother liquor from crystal crop I was evaporated to a 350 ml. volume, sodium chloride was filtered off while hot, and the filtrate cooled slowly to produce 60 g. of crop II.

Further concentration of the mother liquor from crop II produces additional small amounts of the product, N-diethanolaminomethanephosphonate disodium salt, pentahydrate $(HOCH_2CH_2)_2N—CH_2—PO_3Na_2·5H_2O$. Total recovery: 450 g. after being dried at 95° C.

The product crystals contained small amounts of sodium chloride impurity, and this was largely eliminated by dissolving 120 g. crude product in 100 ml. of water at 70–80° C., decolorizing with activated charcoal, filtering while hot and allowing the liquor to cool and recrystallize. 20.35 g. of recrystallized

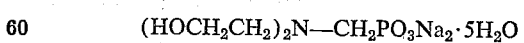

dried at 90–95° C. to a constant weight (5 hrs.) showed a loss of 4.75 g. which corresponds to 4 moles of water; further drying at 120° C. yields the fifth mole of crystal water. The oven-dry anhydrous salt was white and stable.

The monohydrate salt was soluble to the extent of about 63.1 g. per 100 ml. water at 30° C., and this solution has a density of 1.23.

Sodium hydroxide lowered the solubility in water and this addition of excess alkali was sometimes useful in separating the product crystals.

EXAMPLE 2

The same reactant quantities and materials were used as in Example 1, but the chloromethylphosphonic acid was dissolved in 200 ml. of water and then added to the undiluted diethanolamine together with 50% NaOH solution to maintain Nile blue indicator alkalinity.

The reaction mixture was then heated at 100° C. ±5° C. under reflux for 20 hours. Sodium chloride was filtered off while hot, and without any water dilution.

This liquid deposited some product crystals before filtration was complete, yet on cooling the filtrate to 0°–5° C., there was deposited 375 g. of crystals as a first crop.

After recrystallization from water, the diethanolamine methylphosphonate disodium salts analyzed as follows for nitrogen:

*Table I*

| Salt | Pentahydrate [1] | Monohydrate [2] |
|---|---|---|
| Percent N, found | 4.12 | 5.50 |
| Percent N, theory | 4.20 | 5.36 |

[1] Air-dried.
[2] Dried to constant weight at 95–100° C.

The anhydrous disodium salt melted at 308–312° C. with decomposition.

The apparent reaction of this example was:

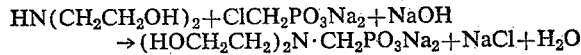

$HN(CH_2CH_2OH)_2 + ClCH_2PO_3Na_2 + NaOH$
$\rightarrow (HOCH_2CH_2)_2N \cdot CH_2PO_3Na_2 + NaCl + H_2O$ The reaction conditions may be varied from those chosen above, as shown in other examples. Caustic soda (sodium hydroxide) is convenient to use in the above reaction because the disodium salt of N-diethanolamine methanephosphonic acid is relatively easily separated by crystallization; but other basic materials may be used.

EXAMPLE 3

130 g. of 50% (by weight) solution of chloromethanephosphonic acid (0.5 mole, 52.5 g. of diethanolamine (0.5 mole), 50 ml. of water and 120 g. of 50% (by weight) NaOH solution were added, in order, with mixing, into a 500 ml. Erlenmeyer flask, and then heated under gentle reflux for 24 hours. The solution darkened in a few hours to a red-brown color.

The filtered, hot alkaline reaction mixture was evaporated to a 270 ml. volume in a Monel beaker and then allowed to cool. After seeding, filtering, washing lightly and drying the pentahydrate crop of crystals at 95° C. for 8 hours, 83 g. of N-diethanolamino-methanephosphonate disodium salt, monohydrate was obtained. A substantial portion of the sodium chloride formed in the reaction remained in solution.

EXAMPLE 4

The same quantities of the same reactants as set forth in Example 3 were mixed with 400 ml. of water, with cooling, and with the pH kept near 12 (pHydrion paper) by the stepwise addition of a 50% caustic soda solution. The mixture was refluxed gently for 24 hours and until a total of 120 g. of 50% (by weight) caustic soda had been used.

The mixture was then treated as in Example 3 to give a first crop of 74 g. of colorless N-diethanolamino-methanephosphonate disodium salt, monohydrate crystals.

EXAMPLE 5

130 g. of 50% chloromethanephosphonic acid solution (0.5 mole) was cooled and treated with 52.5 g. (0.5 mole) diethanolamine dissolved in 25 ml. of water. The mixture was adjusted to Nile blue indicator alkalinity with 50% (by weight) potassium hydroxide solution and then heated at 95–100° C. for 24 hours. During this time an additional amount of 50% potassium hydroxide solution was added to maintain Nile blue indicator alkalinity and until a total of 170 g. of alkaline solution had been used.

The reaction liquid was evaporated to a 150 ml. volume, filtered while hot to remove potassium chloride crystals and allowed to cool. Neither cooling nor standing in a vacuum desiccator gave crystals of the very soluble and hygroscopic dipotassium salt of diethanolaminomethane-phosphonic acid from its concentrated aqueous solution.

Continued concentration of the product solution finally gave crystals of the dipotassium salt, together with small amounts of potassium chloride.

Pure diethanolamino-methanephosphonic acid was prepared from the reaction solution of the dipotassium salt by passing the solution through an ion exchange resin (acid form). The acidic effluent was concentrated by evaporation under vacuum and treated with a 50% NaOH solution at about 80° C. Ethanol was added and mixture cooled to about 5° C. to crystallize out the disodium salt pentahydrate. The crystalline product was then dissolved in water and passed through an ion exchange resin (acid form) and the acid effluent concentrated, treated with ethanol and cooled to crystallize the pure diethanolamino-methanephosphonic acid which had a melting point of 144–146° C.

EXAMPLE 6

A solution of the disodium salt of chloromethanephosphonic acid was made by neutralizing 130 g. (0.5 mole) of 50% (by weight) solution of chloromethanephosphonic acid with 80 g. of 50% (by weight) NaOH solution (1.0 mole). This solution was added with cooling to 52.5 g. of diethanolamine (0.5 mole) in 100 ml. of water. Then, 62 g. of sodium carbonate monohydrate, (0.5 mole) was added. The mixture was digested at 95–100° C. for 24 hours, concentrated to a 270 ml. volume, filtered while hot and allowed to cool. The filtrate, after seeding with disodium N-diethanolaminomethanephosphonate pentahydrate, gave a good crop of product crystals. The product was filtered, and dried at 95–100° C. to a constant weight to yield 72 g. of disodium diethanolamino-methanephosphonate monohydrate.

Either ammonia or an excess of diethanolamine itself was alkaline enough to cause the desired condensation, but isolation of the product is easier as the disodium salt.

Where the diethanolamine or ammonia was used as the base, the salt solutions were identified by conversion to the acid in the manner described in Example 5.

Recrystallized disodium diethanolamino-methane-phosphonates analyzed as shown below. The pentahydrate was carefully air-dried material; the monohydrate had been dried to a constant weight at 95° C.; the anhydrous salt was dried at 120° C.

*Table II (A)*

|  | Found | Theory |
|---|---|---|
| (a) Pentahydrate crystals: |  |  |
| Percent Nitrogen (N) | 4.1 | 4.20 |
| Percent Phosphorus (P) | 9.25 | 9.31 |
| Molecular weight by titration | 336 | 333 |
| Titration inflexion points: |  |  |
| (1) pH | 3.1 |  |
| (2) pH | 7.1 |  |
| (b) Monohydrate: |  |  |
| Percent Nitrogen (N) | 5.3 | 5.36 |
| Percent Phosphorus (P) | 11.93 | 11.87 |
| Molecular weight by titration | 262 | 261 |
| Titration inflexion points: |  |  |
| (1) pH | 3.2 |  |
| (2) pH | 7.3 |  |
| (c) Anhydrous Disodium Salt: |  |  |
| Percent Nitrogen (N) | 5.7 | 5.76 |
| Percent Phosphorus (P) | 12.8 | 12.76 |
| Molecular weight by titration | 243 | 243 |
| Titration inflexion points: |  |  |
| (1) pH | 3.1 |  |
| (2) pH | 7.1 |  |
| Percent Residue on Ignition (as $Na_4P_2O_7$) | 54.6 | 54.73 |
| Percent $Na_4P_2O_7$ in Ignition residue (based on original sample) | 54.1 | 54.73 |
| Percent $Na_4P_2O_7$ in Ignition residue | 99.1 | 100 |

The solubility of disodium diethanolamino-methane-phosphonate and its hydrates in grams/100 ml. added $H_2O$ is shown in Table II (B).

Table II (B)

| Temp., °C. | Anhydrous | Monohydrate | Pentahydrate |
|---|---|---|---|
| 10 | 49.1 | 54.8 | 82.3 |
| 20 | 52.4 | 58.6 | 89.1 |
| 30 | 56.3 | 63.1 | 97.4 |
| 40 | 61.7 | 69.4 | 109.5 |
| 50 | 70.4 | 79.7 | 130.5 |

EXAMPLE 7

Crystals of the free N-diethanolaminomethane-phosphonic acid were prepared by passing a solution containing 25 g. of the anhydrous disodium salt dissolved in 200 ml. of distilled water through a column of the acid form of Amerlite IR-100 ion exchange resin and collecting the acidic portion of the effluent. After the effluent was evaporated to a 100 ml. volume at 80–90° C., the volume was further decreased to 40 ml. in a desiccator. One liter of dry ethanol was added and the mixture was cooled to 0° C. After standing one day, the precipitated crystals were filtered off and stored in a vacuum desiccator.

This procedure was repeated twice more to obtain a combined yield of 28 g. of the free acid for analysis (yield: 76% of theory).

By the above procedure, free N-diethanolamino-methanephosphonic acid is a well formed, white crystalline material that is extremely soluble in water.

Table III

ANALYTICAL TESTS ON $(HOCH_2CH_2)_2N \cdot CH_2PO_3H_2$

| | Found | Theory |
|---|---|---|
| Melting Point °C | 144–146 | |
| Percent Nitrogen (N) | 6.9 | 7.04 |
| Percent Phosphorus (P) | 15.5 | 15.58 |
| Molecular weight by titration | 197 | 199 |
| Titration inflexion points: | | |
| (1) pH | 7.3 | |
| (2) pH | 3.1 | |

One of the most interesting properties of the alkanol-aminoalkanephosphonates is their ability to form chelates with multivalent metal ions in solution. Thus, our chelating materials may be used to sequester many multivalent metal ions in combination with detergents as well as in dyeing processes wherein the sequestering of multivalent metal ions is desirable. Surprisingly, several of these metal chelates are stable in solution at quite a high pH; for example, the chelate formed from 2 moles of the diethanolamino-methanephosphonate per 1 mole of ferric iron was found stable at or above a pH of 12, or in 5% to 10% aqueous ammonia solution for a period of three months or longer. This iron chelate was found capable of providing iron for the greening of chlorotic plants, such as beans attempting to grow in calcareous, chlorosis-producing soil.

Chelant powder was shown by mixing 10 ml. of 0.1 molar metal ion solution with 75 ml. of distilled water, and adding 10 ml. of 0.2 molar diethanolamine-methanephosphonic acid disodium salt, and adjusting the pH to 10 (or other specified alkaline pH).

Table IV

SOLUTION'S CHARACTER AT pH OF 10
(ROOM TEMPERATURE)

| Metal Ion and Valence | With chelant | Without chelant |
|---|---|---|
| Al (III) (pH of 9) | clear soln. (pH of 9) | white precipitate (pH of 9). |
| Cu (II) | vivid blue solution | greenish precipitate. |
| Mn (II) | amber soln. (precipitates slightly after several days). | rust-colored precipitate at once. |
| Ni (II) | pale green solution | green precipitate. |
| Pb (II) | clear solution | white precipitate. |
| Zn (II) | pale amber solution | Do. |
| Ce (IV) | do | Do. |
| Ag (I) | clear soln. (slowly precipitates under influence of light). | dark precipitate at once. |
| Ca (II) (pH of 11) | white precipitate | white precipitate. |
| Sn (II) | precipate which slowly dissolves. | Do. |

Chelation of ferric-iron in aqueous solutions is of particular interest with diethanolamino-methanephosphonic acid and its salts. Ten ml. of 0.1 molar solution of ferric chloride ($FeCl_3$) were diluted with 50 ml. of distilled water and varying volumes of approximately 0.1 molar disodium diethanolamino-phosphonate were added. The pH was adjusted to 9.0 and the following observations were noted:

Table V

| Approx. mole ratio chelant: Fe | Solution Characteristics | |
|---|---|---|
| | Cool (Room Temp.) | After Boiling |
| 1:1 | orange solution | red precipitate. |
| 3:2 | yellow solution | Do. |
| 2:1 | colorless solution | orange solution. |
| 5:2 | do | colorless solution. |
| (Fe only) | red precipitate | dark red precipitate. |

These data indicated that 2 moles of chelant were required per mole of ferric-iron for most stable, soluble celate formation, with a weaker complex at 1:1 mole ratio.

The pH was varied in the following tests using 50 ml. of water, 10 ml. of 0.1 molar $FeCl_3$ and 25 ml. of 0.1 molar disodium diethanolamino-methanephosphonate (a slight excess of chelant, 5:2 mole ratio):

Table VI

| pH | | Solution Characteristics | |
|---|---|---|---|
| At start | After heating | Cool (Room Temp.) | Hot solution |
| 6.0 | 5.85 | greenish soln | amber soln. |
| 7.0 | 6.05 | yellowish soln | orange soln. |
| 8.0 | 7.2 | pale amber soln | Do. |
| 9.0 | 9.1 | colorless soln | yellowish soln. |
| 9.5 | | do | colorless soln. |
| 10.0 | 9.4 | do | Do. |
| 11.0 | 9.7 | do | Do. |
| 12.0 | 11.3 | do | Do. |

No floc or precipitate appeared in any of these tests, this showed a very extraordinary stability for the ferric chelate since the best known commercial chelating materials will form well-developed ferric-iron flocs or precipitates at a pH of 9 to 11.

The ferric chelate solutions after acidification with dilute nitric acid (as well as the original chelant solution) show no inorganic orthophosphate precipitate with a molybdate reagent.

At a pH of 6–13, the diethanolamino-methanephosphonate aqueous solutions were quite stable, showing substantially unchanged chelating power for ferric-iron even after heating at 85–90° C. at the designated pH for 72 hours before iron was added. The following tests were made at room temperature using a 5:2 chelant:Fe+++ mole ratio (slight excess of chelant):

Table VII

| pH | Fe-Chelate solution characteristics | |
|---|---|---|
| | Fresh solution | After 14 days |
| 6 | pale yellow | pale greenish. |
| 7 | do | pale yellow. |
| 8 | pale amber | orange. |
| 9 | colorless | pale amber. |
| 10 | do | pale yellowish. |
| 11 | do | colorless. |
| 12 | do | Do. |
| 13 | slight floc | floc. |

The calcium chelate of diethanolamino-methanephosphonate ion was less stable than the ferric-iron chelate. Added orthophosphate ion (pH 9.5) precipitated calcium phosphate but not iron phosphate from a mixed Ca-Fe chelate solution.

Near a pH of 7 only, strong solutions of the Fe(III)-chelate tended to form stiff gels on standing; this made isolation of the solid Fe-chelate difficult, but one probable structure was [(HOCH$_2$CH$_2$)$_2$N—CH$_2$PO$_3$]·Fe·OH. The gels reconstitute to liquids when water is added and mixed therewith.

Stability of the ferric chelate with calcium competing was also shown by lack of breakdown or ferric precipitate formation when 150 ml. of complex solution (0.01 mole of ferric ion and 0.025 mole of disodium diethanolaminomethanephosphonate) were passed, at the rate of 1 drop per second, through a white, granular limestone column, 1.5 cm. in diameter x 60 cm. in length.

A partial separation of the ferric complex was effected by adjusting a 0.1 molar solution of the 2:1 mole ratio complex to a pH of 6. Part of the complex precipitated as a white floc. After oven-drying, this floc analyzed as follows:

|  | Percent |
|---|---|
| Phosphorus (P) | 11.55 |
| Nitrogen (N) | 5.36 |

Theoretical values of

[(HOCH$_2$CH$_2$)$_2$N·CH$_2$PO$_3$]·Fe·OH were 11.48% P, 5.19% N and 20.3% Fe.

EXAMPLE 8

The separation of the very slightly soluble, basic ferric diethanolaminomethanephosphonate 1:1 mole ratio complex was easily effected by dissolving 19.9 g. ferric sulfate (0.05 mole) in 200 ml. water and adding to a solution of 37.55 g. (0.155 mole) disodium diethanolaminomethanephosphonate, anhydrous in 200 ml. of water. The solution was diluted to 1 liter and adjusted to approximately pH 6.0. A green-white floc which separated was filtered, washed with water until chloride-free, then oven dried at 90° C. to a greenish solid. This solid analyzed well for the composition (HOCH$_2$CH$_2$)$_2$NCH$_2$PO$_3$FeOH:

| | Found | Theory |
|---|---|---|
| Percent N | 5.36 | 5.19 |
| Percent P | 11.55 | 11.48 |
| Percent Fe | 20.92 | 20.69 |
| Percent Na | Trace | 0.00 |

The solid, insoluble diethanolamine-methanephosphonic-iron complex may be prepared by an alternate procedure. When diethanolamine - methanephosphonic acid was slurried with freshly precipitated ferric hydroxide in a mole ratio of 2:1 and the pH adjusted to approximately 6 to 7, a greenish-white amorphous precipitate formed after several days, leaving a red mother liquor. The precipitate was only slightly soluble in water and contained over 80% of the total iron input.

The precipitate was dried to a constant weight at 100° C. It analyzed 12.25% P and 20.3 Fe.

The phosphorus content corresponds closely to that given above. This substantiates the 1:1:1 ratio of P:N:Fe of the above formula. The precipitate redissolves if the slurry pH is adjusted either above or below the pH range in which it was formed, though some iron separates out at high pH values.

Other alkanolamines were readily reacted with chloromethane phosphonates to produce alkanolaminophosphonates that had valuable chelating properties, particularly in regard to ferric ion.

The 2:1 chelate solution of diethanolamine-methanephosphonate and Fe-ion was also stable in rather strong ammonia water. Fifty ml. of ammonia water (28% NH$_3$) were diluted with varying volumes of water and 10 ml. of a solution 0.1 molar in ferric-iron and 0.2 molar in disodium diethanolamino-methanephosphonic acid. At room temperature no iron floc formed in any solution described below:

Table VIII

| Ml. of 28%-NH$_3$ Ammonia Water | Ml. of Added Water | Resultant Soln. after Standing | |
|---|---|---|---|
| | | 1 day | 6 days |
| 50 | 200 | clear | clear. |
| 50 | 150 | do | Do. |
| 50 | 100 | do | Do. |
| 50 | 50 | do | Do. |
| 50 | 25 | do | Do. |

For comparison purposes, other known iron chelate solutions containing 55 mg. of iron were added to 50 ml. of 28%-NH$_3$ ammonia water diluted with 150 ml. of water with the following results (room temperature):

Table IX

| Iron Chelate | Resultant Solution |
|---|---|
| Ethylenediamine tetracetate (12% Fe). | Red floc and precipitate. |
| Diethylenetriamine pentacetate (12.1% Fe). | Rust-red floc and precipitate. |

In alkaline solution (above pH 7.5) there must be at least two moles of diethanolaminomethanephosphonate per ferric ion to form a stable, soluble iron chelate. Possible mole ratios include 2:1, 5:2 and 3:1. Water-soluble chelates of ferric iron and aluminum have been made having mole ratios of 2.5 and 3 diethanolaminomethanephosphonate to 1 iron or aluminum, respectively. These preparations were made by adding large volumes of ethanol or acetone to alkaline, chelate water solutions, sodium ion being also present.

Analyses of these water-soluble precipitates indicate somewhat more sodium present than would be indicated for the simplest possible chelate structures.

If we indicate the diethanolaminomethylphosphonic acid ion by the symbol "DEMPA":

Simple, soluble sodium-ferric chelates would be (DEMPA)$_2$·Fe·OH·Na$_2$ (mole ratio 2:1) and (DEMPA)$_3$·Fe·Na$_3$ (mole ratio 3:1).

Actual analyses gave compositions nearer to (DEMPA)$_2$Fe(O)Na$_3$ and (DEMPA)$_3$Fe(OH)Na$_4$, respectively.

The situation was similar for the aluminum chelates isolated by non-aqueous solvent precipitation.

We cannot be limited to any one particular structure for these water-soluble chelates, since coordination or secondary-bonding is possible not only with nitrogen but also phosphorus and hydroxyl groups. At high alkalinity some sodium can combine with alkanolamine-hydroxyl groups. Formulae shown for this type of chelate illustrate only one of several types possible.

The procedure following allowed the separation of a solid, water-soluble ferric chelate from input materials of mole ratio 2:1:3 for DEMPA:iron:sodium.

EXAMPLE 9

A 27 g. (0.1 mole) sample of ferric chloride hexahydrate crystals was dissolved in 1 liter of water, and precipitated with $NH_4OH$ to form $Fe(OH)_3$. The precipitate was filtered, washed free of any chloride ion, then stirred with 39.8 g. (0.20 mole) diethanolaminomethanephosphonic acid. When all the $Fe(OH)_3$ had been converted to the pale green insoluble complex (DEMPA-Fe-OH: the compound produced in Example 8), there was added 33.3 g. (0.1 mole) disodium diethanolaminomethanephosphonate pentahydrate followed by 200 ml. 1.0 M NaOH (0.2 mole). The solution turned a clear pale green, with all solids dissolved (pH 9.2). Concentration of this liquor to 200 ml., followed by precipitation with 800 ml. ethanol, yielded an easily crystallized green solid which was filtered, washed with 100 ml. ethanol and dried in vacuo at 90° C. A 70 g. yield of anhydrous material was obtained, the analysis of which is tabulated below along with a postulatable product composition:

|  | Found | Theory for $[(HOCH_2CH_2)_2NCH_2PO_3]_3FeNa_4OH$ |
|---|---|---|
| Percent N | 5.50 | 5.56 |
| Percent Fe | 7.35 | 7.38 |
| Percent P | 12.44 | 12.29 |
| Percent Na | 12.65 | 12.16 |
| Percent Ash | 55.34 | 55.15 (as $NaFeP_2O_7 + Na_3PO_4$) |

The analytical results above indicate the isolated product was close in composition to the input material mole ratio, as well as that of the theoretical compound. The structural formula for such compounds would include ionic bonding of ferric iron to the acidic phosphonic group, and in addition, coordination with the N or both N and O of the alkyl chain.

The chelation of aluminum by diethanolaminomethanephosphonic acid is analogous to that of ferric iron as shown below for the insoluble, first stage (1:1 mole ratio complex):

$2(HOCH_2CH_2)NCH_2PO_3Na_2 + \frac{1}{2}Al_2(SO_4)_3$
$\rightarrow (HOCH_2CH_2)_2NCH_2PO_3Al \cdot OH\downarrow$
$+ 3/2 Na_2SO_4 + (HOCH_2CH_2)_2NCH_2PO_3NaH$ The insoluble aluminum complex has the same pH tolerance as that of the insoluble ferric (1:1) complex and was easily prepared as shown in the following example.

EXAMPLE 10

Disodium diethanolaminomethanephosphonate pentahydrate, 66.6 g. (0.2 mole), was dissolved in 250 ml. water, and then treated while stirring with a solution of 33.3 g. of $Al_2(SO_4)_3 \cdot 18H_2O$ (0.1 mole Al) in 250 ml. of water.

After 12 hours the white slurry was filtered by gravity and washed with 50 ml. portions of water until the mother liquor was sulfate free. After a final wash with 50 ml. of ethanol, the white product was dried in vacuo at 85°–90° C. to a constant weight of 23 g. (95% of theory for $(HOCH_2CH_2)_2NCH_2PO_3Al(OH)$).

The white product is insoluble in water, ethanol and most common organic solvents. It is soluble in dilute HCl, $HNO_3$ and soluble in alkalies. The product $(HOCH_2CH_2)_2NCH_2PO_3Al \cdot OH$ analyzed 5.88% N, close to the theoretical value of 5.81% N.

When converting the insoluble aluminum complex to the soluble chelate, similar results were encountered as with the soluble ferric chelate. While a stable soluble chelate of aluminum is attained at a ratio of 2:1:3 diethanolaminomethanephosphonic acid:aluminum:sodium, in solution, the solid compound isolated does not have the same composition.

The procedure used for the preparation of the soluble aluminum chelate is outlined below:

EXAMPLE 11

One-tenth mole of the insoluble basic aluminum diethanolaminomethanephosphonate (prepared as in Example 10) was dissolved in 100 ml. of water containing 33.3 g. (0.1 mole) of disodium diethanolaminomethanephosphonate and 4 g. NaOH (0.1 mole). The solution was filtered and added to 500 ml. of ethanol. The product was collected, dried, redissolved in 50 ml. of water, reprecipitated with 400 ml. of ethanol and filtered dry. This white product was dried in vacuo to a constant weight of 45 g. (88% of theory).

This aluminum chelate is very soluble in water and insoluble in ethanol, acetone and most common organic solvents. Analysis of the isolated product is tabulated below along with the values for the input ratio compound.

|  | Found | Theory for $[(HOCH_2CH_2)_2NCH_2PO_3]_2Al(O)Na_3$ |
|---|---|---|
| Percent N | 5.45 | 5.51 |
| Percent P | 11.91 | 12.49 |
| Percent Na | 11.92 | 13.64 |
| Percent Ash | 51.28 | 56.52 (as $AlPO_4 + Na_3PO_4$) |

The chelates of some divalent metals (M) with diethanolaminomethanephosphonic acid were easily isolated, despite their extreme water-solubility, by the procedure shown below:

$(HOCH_2CH_2)_2NCH_2PO_3H_2 + M(OOC-CH_3)_2$
$\rightarrow (HOCH_2CH_2)_2NCH_2PO_3M + 2CH_3COOH$

EXAMPLE 12

19.9 g. (0.1 mole) of diethanolaminomethanephosphonic acid in 25 ml. of water were treated with 19.9 g. cupric acetate monohydrate (0.1 mole) and stirred to a clear blue syrup. Addition to 400 ml. of ethanol formed a green gel which was filtered, then dried under vacuo to a brittle blue residue. The crushed material was washed with two 50 ml. portions of ethanol, dissolved in 30 ml. of hot water (containing 0.1 g. $CuAc_2 \cdot H_2O$) and reprecipitated with 400 ml. ethanol. The gel was filtered, dried in vacuo at 75° C., crushed and stored. The yield was 20.5 g. (80% of theory).

This procedure was repeated with manganous acetate and lead acetate to yield two white solids, soluble in water, insoluble in ethanol, acetone and most organic solvents. Typical nitrogen determinations were:

|  | Percent N Found | Percent N Theory |
|---|---|---|
| $(HOCH_2CH_2)_2NCH_2PO_3Cu$ | 5.23 | 5.31 |
| $(HOCH_2CH_2)_2NCH_2PO_3Mn$ | 4.90 | 5.55 |
| $(HOCH_2CH_2)_2NCH_2PO_3Pb$ | 3.34 | 3.46 |

EXAMPLE 13

0.2 mole of monoethanolamine was added to 25 ml. of water and maintained below 55° C., 0.4 mole of chloromethanephosphonic acid and 0.8 mole of 50% (wt.) NaOH solution were added at Nile blue indicator alkalinity. The mixture was heated to boiling for 16 hours and Nile blue alkalinity was maintained by the addition of further, small, amounts of caustic soda until a total of 1.2 moles had been used. After cooling and filtering to remove salt (NaCl), the dilute solution of the reaction product sequesters calcium weakly in cool, aqueous solution.

From this solution of $HOC_2H_4N(CH_2PO_3Na_2)_2$, stable, soluble cupric and ferric chelates may be formed at a mole ratio of 2 moles of the reaction product to 1 mole of cupric-copper or ferric-iron. These chelate solutions were stable, when cooled, at a pH of 6 to 11, and at a pH of 6 to 10 at 90° C. One:one mole ratio complexes were not quite as stable. The starting reactants gave no stable iron complex at a pH of 6 to 10.

Insoluble zinc, lead and calcium salts of monoethanolamine bis-N-methanephosphonic acid were prepared as follows:

The dizinc salt was prepared by treating 50 ml. of a molar solution of tetrasodium monoethanolamine N,N-dimethanephosphonate, in 100 ml. of water with 100 ml. of 1.0 M zinc chloride solution. The mixture was heated below boiling in order to promote precipitation. A microcrystalline insoluble product formed immediately. After filtering, washing with several portions of ethanol, and drying the product at 105–110° C., it analyzed 16.53% P. This corresponds with the theoretical value of 16.54% P for the formula $HOCH_2CH_2N(CH_2PO_3Zn)_2$.

The dilead salt was prepared in a similar manner except that the crystalline precipitate was washed with hot water to wash out by-product soluble lead salts. The dilead monoethanolamine bis-N-methanephosphonate $$HOCH_2CH_2N(CH_2PO_3Pb)_2$$

after drying 16 hours at 120° C. analyzed 9.13% P compared to the theoretical value of 9.40% P.

The dicalcium monoethanolamine bis-N-methanephosphonate, $HOCH_2CH_2N(CH_2PO_3Ca)_2$, was prepared by combining 100 ml. of a 1.0 M solution of tetrasodium monoethanolamine bis-N-methanephosphonate with 200 ml. of 1.0 M calcium chloride solution. The precipitated micro-crystalline product, dried at 105° C., had a phosphorus content of 19.14% compared to the calculated value of 19.46%.

EXAMPLE 14

Monoethanolamine bis-N-methanephosphonic acid was prepared by converting the above calcium salt to the acid in the following manner:

200 ml. of a 2.0 molar tetrasodium monoethanolamine N,N-dimethanephosphonate was mixed with 200 ml. of water and treated with 400 ml. of 1.0 M calcium chloride solution. The precipitated calcium salt was separated, washed with boiling water.

The product was suspended in 400 ml. of water and treated with 27 g. (0.3 mole) of oxalic acid. The precipitated calcium oxalate was filtered off, and the filtrate passed through an ion exchange resin (acid form) to remove any remaining cations. The filtrate was then concentrated under vacuo to a viscous, tan, hygroscopic oil. Analysis of the product showed it to have substantially the formula, $HOCH_2CH_2N(CH_2PO_3H_2)_2$ with titration inflexion points at a pH of 3.5 and 9.2.

By controlling the reacting proportions of a primary alkanolamine and the chloroalkanephosphonate, it is possible to produce a monoalkanol monoalkanephosphonate secondary amine which is capable of further reaction with suitable substituents, or which, is itself a highly suitable chelating agent. Such reaction is illustrated by the following equation:

$$HOCH_2CH_2NH_2 + ClCH_2PO_3Na_2 + NaOH \rightarrow$$
$$HOCH_2CH_2NHCH_2PO_3Na_2 + NaCl + H_2O$$

EXAMPLE 15

120 g. (2 moles) of monoethanolamine was placed in 200 ml. of water, and while cooling and stirring, 307 g. of 84% chloromethanephosphonic acid was added together with 50% caustic soda solution in an amount sufficient to maintain the pH of the reaction mixture above 10.0.

After 24 hours reflux, the reaction mixture was evaporated below one liter, cooled, filtered and diluted to one liter volume to give a one molar solution of the product, disodium monoethanolamine N-methanephosphonate $(HOCH_2CH_2NHCH_2PO_3Na_2)$. When used at a 2:1 ratio of the compound to metal ion, both ferric and cupric ions were successfully chelated at a pH of 10.0.

The zinc salt of the above compound was prepared by combining 50 ml. of the above molar solution of disodium monoethanolamine N-methanephosphonate with 50 ml. of one molar zinc chloride solution. The precipitated crystalline product, $HOCH_2CH_2NHCH_2PO_3Zn$, was separated, washed with ethanol and dried at 110° C. It analyzed 14.08% P (theory 14.19% P).

EXAMPLE 16

One mole of trimethylolaminomethane, $$(HOCH_2)_3CNH_2$$

was reacted with 2 moles of chloromethanephosphonic acid under hot alkaline conditions such as those described in Example 1. The reaction mixture contains tetrasodium trimethylolamine bis-N-methanephosphonate. The product, when used at a 2:1 compound to metal ion ratio, will chelate both cupric and ferric ions at pH values from 6 to 10.

Identification was made by precipitation and analysis of the barium salt. Fifty ml. of one M solution of the above product was combined with 100 ml. of one M barium chloride solution. The precipitated micro-crystalline product was separated and dried at 120° C. It analyzed 11.07% P compared to the theoretical value of 11.28% for the formula, $(HOCH_2)_3CN(CH_2PO_3Ba)_2$.

The dilead salt was also prepared in a similar manner and analyzed 8.08% P (theory 8.62).

EXAMPLE 17

The free acid, trimethylolaminomethane N,N-dimethanephosphonic acid was prepared by precipitating the calcium salt and treating the calcium salt with oxalic acid to convert the product to the free acid with precipitation of insoluble calcium oxalate. The calcium oxalate was filtered off and the filtrate concentrated to a clear, viscous, hygroscopic oil. Molecular weight determination and titration pH inflexion points showed the oil product to be substantially the pure free acid (mol. wt. of 316; theory 309) (inflexion pH 3.5 and 9.0).

EXAMPLE 18

One mole of 1,1-dimethylol-1-aminoethane, $$CH_3(CH_2OH)_2CNH_2$$

was reacted with 2 moles of chloromethanephosphonic acid under hot alkaline conditions such as those described in Example 1 while maintaining a pH of above 11.0 at a temperature near boiling for 24 hours. The reaction mixture which contained the tetrasodium 1,1-dimethylol-1-aminoethane bis-N-methanephosphonate was successfully used to chelate cupric and ferric ions at a 2:1 chelate:metal ion ratio.

Identification of the compound was made by precipitation of the crystalline calcium salt. Analysis of the calcium salt showed a phosphorus content of 17.08% compared to the theoretical value of 16.8% P for the formula $CH_3(CH_2OH)_2CN(CH_2PO_3Ca)_2$.

EXAMPLE 19

One mole (163 g.) of commercial aminopropyl diethyleneglycolether (polyglycolamine, H–163), $$H(OCH_2CH_2)_3CH_2NH_2$$

in 175 ml. of water was treated with 260 g. (2.0 moles) of chloromethanephosphonic acid and 350 g. of 50% (by weight) caustic soda at 100° C., followed by the addition of 160 g. of 50% NaOH during a 24 hour reflux period (at pH of 11–12). The resulting solution contains tetrasodium triethyleneglycolmethylamine bis-N-methanephosphonate which chelates cupric ions well at a pH of 10.0 in a 2:1 chelate to metal ion ratio.

Identification of the compound was made by precipitation and analysis of the dilead salt. It had a phosphorus content of 7.54% compared to the theoretical value of 8.15% P for $H(OCH_2CH_2)_3CH_2N(CH_2PO_3Pb)_2$.

EXAMPLE 20

The free acid of the compound of Example 19 was prepared by converting the tetrasodium salt to the dibarium salt and then liberating the free acid by treating with oxalic acid. The free acid solution was concentrated and dried several days in a desiccator to yield a viscous oil having a molecular weight of 398 (theory 351), and titration inflexion points at a pH of 3.2 and 9.5.

EXAMPLE 21

One mole of N,N'-bis(hydroxyethyl) ethylenediamine, [(HOCH$_2$CH$_2$)—NHCH$_2$]$_2$, was reacted with 2 moles chloromethane-phosphonate at Nile blue indicator alkalinity under reflux for 12 hours. After concentration and hot filtration removal of precipitated NaCl, there was obtained a solution of the tetrasodium salt of the acid, [—CH$_2$—N—(CH$_2$CH$_2$OH)CH$_2$PO$_3$H$_2$]$_2$. The reaction product chelated ferric and cupric ions nicely at a pH of 10, at a mole ratio of chelant: Metal=1:1. A slight excess of chelant gave a heat-stable chelate solution, and the cool chelate solution was stable at a pH 5 to 12. The reaction product also formed a chelate with calcium ion (pH of 8).

Identification of the compound was made by precipitation and analysis of the dibarium salt. It had a phosphorus content of 10.23% compared to a theoretical of 10.21% for [—CH$_2$N(CH$_2$CH$_2$OH)CH$_2$PO$_3$Ba]$_2$.

EXAMPLE 22

One mole aminoethylethylolamine,

HOCH$_2$CH$_2$NHCH$_2$CH$_2$NH$_2$ and 3 moles of chloromethanephosphonic acid were reacted in a hot caustic soda solution to give a solution of hexasodium hydroxyethylethylenediamine tris-N,N,N'-methanephosphonate which chelates cupric and ferric ions very strongly at a 1:1 chelate to metal ion ratio.

Identification was made by precipitation and analysis of the tricalcium salt. The tricalcium salt had a phosphorus content of 18.95% compared to 18.60% for the compound, HOCH$_2$CH$_2$N(CH$_2$PO$_3$Ca)CH$_2$CH$_2$N(CH$_2$PO$_3$Ca)$_2$

EXAMPLE 23

Tetrasodium 2-hydroxy 1,3-propylenediamine bis-N,N'-methanephosphonate was prepared by reacting one mole of 2-hydroxy, 1,3-propylenediamine,

H$_2$NCH$_2$CH(OH)CH$_2$NH$_2$ with 2 moles of disodium chloromethanephosphonate in a hot caustic soda solution. The product chelated ferric and cupric ions very strongly at a pH of about 10.0 in a 1:1 compound to metal ion ratio.

The dicalcium salt was precipitated by treatment with a calcium chloride solution. The crystalline dicalcium 2-hydroxy 1,3-propylenediamine bis-N,N'-methanephosphonate had a phosphorus content of 17.83% (theory 17.51%).

EXAMPLE 24

One mole (165 g.) of α-methylbenzylethanolamine, C$_6$H$_5$CH(CH$_3$)NHCH$_2$CH$_2$OH, was reacted with 0.25 mole of chloromethanephosphonic acid and 5 ml. of water for 20 hours at 140° C. The thick liquid reaction mixture was cooled, diluted with 250 ml. of water, 60 g. of 50% NaOH solution (0.75 mole) and 350 ml. of ethanol. The solution was then cooled to 0° C. and the product crystallized out and separated by filtration. The separated crystalline product was washed with 75 ml. of ethanol and dried at room temperature. On heating to constant weight at 100° C. the product lost 5 moles of water of crystallization. The anhydrous product (37.8 g.) had a molecular weight of 301 by titration (theory 303), a nitrogen content of 4.45% compared to 4.62% for the formula C$_6$H$_5$CH(CH$_3$)N(CH$_2$CH$_2$OH)CH$_2$PO$_3$Na$_2$ The product chelated cupric ions at a pH of about 10.0 in a 2:1 compound to metal ion ratio.

The uses of the compounds described in this application are versatile and varied.

The soluble iron chelates of diethanolaminomethanephosphonic acid were found capable of providing iron for the greening of chlorotic plants. Beans, attempting to grow in calcareous, chlorosis-producing soil responded satisfactorily to 50–100 p.p.m. chelate in soil, and gave green plants, while the untreated bean plants still showed chlorosis. The chelates of diethanolaminomethanephosphonates with Mn, Cu, Zn and other "essential" agricultural trace metals are also stable in alkaline solutions. Thus they may also be used to treat plants deficient in these elements.

Alkanolaminomethanephosphonic acids are quite effective for rust and oxide removal from metal surfaces (with or without a reducing agent such as sulfite, hyposulfite, sugars, hydroquinone, etc.) in the pH range 6 to 9, where rust and tarnish removal is normally difficult or not possible. Reducing agents alone do not remove rust, but their use with alkanolaminophosphonates speeds up rust removal appreciably.

A general formulation is:

| | G. |
|---|---|
| Sodium alkanolaminomethanephosphonate | 20 |
| Sodium "bisulfite" (58.5% SO$_2$) | 10 |
| Water | 370 |

Adjusted to pH 8.0 with NaOH; 25° C.

Strips of fresh rusted iron (total area 78.8 sq. cm.) were immersed, cool in the above solution for a maximum of three hours; the rust either dissolved or was loosely held on the surface. In the latter case, a gentle water rinse removed the rust. The results were clean metallic surfaces. For comparison a solution of 2.5% NaHSO$_3$ (58.5% SO$_2$) adjusted to pH 8.0 with NaOH was used as a "blank" or control test. The results are tabulated below.

Table X

| Compound | Wt. Rust Lost (g.) | Type of Action |
|---|---|---|
| [—CH$_2$—N(CH$_2$CH$_2$OH)—CH$_2$PO$_3$Na$_2$]$_2$ | 0.1596 | rust remaining is removed by rinse. |
| CH$_3$—N(CH$_2$CH$_2$OH)(CH$_2$PO$_3$Na$_2$) | | |
| CH$_2$—N—(CH$_2$PO$_3$Na$_2$)$_2$ | 0.2284 | very rapid; clean metal surface. |
| HOCH$_2$CH$_2$N(CH$_2$PO$_3$Na$_2$)$_2$ | 0.1055 | clean metal surface. |
| N(CH$_2$PO$_3$Na$_2$)$_2$CH$_2$(CH$_2$CH$_2$O)$_3$H | 0.0872 | few rust spots remained. |
| HOCH[CH$_2$NH(CH$_2$PO$_3$Na$_2$)]$_2$ | 0.2636 | very rapid, all rust dissolved. |
| (HOCH$_2$)$_3$CN(CH$_2$PO$_3$Na$_2$)$_2$ | 0.1462 | clean metal surface. |
| HOCH$_2$CH$_2$NHCH$_2$PO$_3$Na$_2$ | 0.2102 | very rapid. |
| (HOCH$_2$CH$_2$)$_2$NCH$_2$PO$_3$Na$_2$ | 0.0832 | clean metal surface. |
| Blank (no phosphonate) | (¹) | rust darkens. |

¹ Less than 0.001.

The solutions were effective both in the acid pH region and in the alkaline range up to pH 9.0. At or above pH 9 rust removal slowed considerably; results using a cool 5% solution of disodium diethanolaminomethanephosphonate and a sulfite solution derived by adjustment of 2.5% sodium bisulfite (58.5% SO$_2$) with NaOH are shown below.

| pH: | Solution |
|---|---|
| 7 | Complete rust removal in 2–3 hours. |
| 8 | Do. |
| 9 | 80% rust removal in 5 hours. |
| 10 | Most rust remains after 5 hours. |

Rust removal with some of the alkanolaminomethanephosphonates may be carried out in the absence of a reducing agent at pH 8.0 by raising the temperature to 70° C. The cleaning action differs in that rust is loosened and scaled off rather than directly dissolved; however, with HOCH[CH$_2$NH(CH$_2$PO$_3$Na$_2$)]$_2$ rust is completely dissolved, even in the cold. The test solutions consist of a 5% solution of the sodium alkanolaminoalkanephosphonate in water, adjusted to pH 8.0; test temperature: 70° C., except last test.

Table XI

| Compound | Temp., ° C. | Wt. Loss (g.) Rust in 3 hrs. | Type of Action |
|---|---|---|---|
| (HOCH$_2$CH$_2$)$_2$NCH$_2$PO$_3$Na$_2$ | 70 | 0.0155 | small amt. of rust removed. |
| HOCH$_2$CH$_2$N(CH$_2$PO$_3$Na$_2$)$_2$ | 70 | 0.1666 | flake-off of rust. |
| 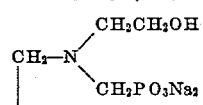 | 70 | 0.1478 | Do. |
| HOCH[CH$_2$NH(CH$_2$PO$_3$Na$_2$)]$_2$ | 25 | 0.1700 | rust completely dissolved. |

The addition of sodium alkanolaminomethanephosphonates to alkaline solutions, such as sodium carbonate or phosphate solutions, speed the cleaning or etching of aluminum and prevents sludging of the cleaning bath. Test solutions were prepared containing the following ingredients:

Solution I: G.
  Sodium alkanolaminomethanephosphonate ___ 10
  Sodium bicarbonate _____ 5
  Water _____ 185
  Adjusted to pH 9.5 with NaOH; 70° C.
Solution II: G.
  Sodium alkanolaminomethanephosphonate ___ 10
  Sodium bicarbonate _____ 5
  Trisodium phosphate _____ 5
  Water _____ 180
  Adjusted to pH 10.3 with NaOH; 70° C.

A Reynolds 3S–H–14 aluminum test strip of 30.1 sq. cm. surface area was immersed in each solution for ½ hour. The results are tabulated below.

Table XII

| Compound | ½ hr. Loss in Soln. I, g. | ½ hr. Loss in Soln. II, g. |
|---|---|---|
| CH$_2$—N(CH$_2$CH$_2$OH)(CH$_2$PO$_3$Na$_2$) / CH$_2$—N—(CH$_2$PO$_3$Na$_2$)$_2$ | 0.0668 | 0.0647 |
| HOCH$_2$CH$_2$N(CH$_2$PO$_3$Na$_2$)$_2$ | 0.0700 | |
| N(CH$_2$PO$_3$Na$_2$)$_2$(CH$_2$(CH$_2$CH$_2$O)$_3$H) | 0.0460 | 0.0580 |
| HOCH[CH$_2$NH(CH$_2$PO$_3$Na$_2$)]$_2$ | 0.1030 | 0.1120 |
| (HOCH$_2$)$_3$CN(CH$_2$PO$_3$Na$_2$)$_2$ | 0.266 | |
| HOCH$_2$CH$_2$NHCH$_2$PO$_3$Na$_2$ | 0.0660 | 0.0736 |
| (HOCH$_2$CH$_2$)$_2$NCH$_2$PO$_3$Na$_2$ | 0.1042 | 0.1113 |
| C$_6$H$_5$—CH(CH$_3$)—N(CH$_2$CH$_2$OH)(CH$_2$PO$_3$Na$_2$) | 0.0465 | |
| Blank (bath with phosphonate omitted) | 0.0350 | 0.0355 |

The solutions containing the alkanolaminomethanephosphonates remained clear, while the baths containing no phosphonate (blank) rapidly developed a white flocculent precipitate. This avoidance of sludge or scale is very desirable in aluminum etching or cleaning baths, as well as speeding up of the etching or cleaning process. Small amounts of soluble silicate are capable of inhibiting or controlling the rate of attack so that polishing rather than etching is the result, even after long immersion.

Alkanolaminomethanephosphonic acids or their ammonium salts may be applied to combustible materials as a highly effective flameproofing agent.

A strip of Whatman No. 1 filter paper, immersed in 10% alkanolaminomethanephosphonic acid, drained and dried at 90° C. would not support a flame when ignited with a Fisher burner or match flame. When a strip of the same paper is treated with the ammonium salt, the material is even less combustible.

The residues left on the paper after 80° C. oven drying are tabulated below. All were more than sufficient for flameproofing.

Table XIII

| Compound, 10% Aqueous Solution | Add-On-Wt., mg./sq./cm. | Percent Add-On |
|---|---|---|
| (HOCH$_2$CH$_2$)$_2$NCH$_2$PO$_3$H$_2$ | 0.929 | 10.3 |
| (HOCH$_2$CH$_2$)$_2$NCH$_2$PO$_3$(NH$_4$)$_2$ | 1.059 | 11.8 |
| HOCH$_2$CH$_2$N(CH$_2$PO$_3$H$_2$)$_2$ | 1.098 | 12.2 |
| HOCH$_2$CH$_2$NHCH$_2$PO$_3$H$_2$ | 0.727 | 8.1 |
| CH$_2$—N(CH$_2$CH$_2$OH)(CH$_2$PO$_3$H$_2$) / CH$_2$—N—(CH$_2$PO$_3$H$_2$)$_2$ | 0.665 | 7.4 |

The addition of disodium diethanolaminomethanephosphonate to phosphatizing baths increases the coating during a given period of exposure. Two zinc phosphatizing baths, one with an alkanolaminophosphonate added, were made up and compared as follows:

| Bath I | G. | Bath II | G. |
|---|---|---|---|
| Zinc | 2.5 | Zinc | 2.5 |
| H$_3$PO$_4$, 85% | 10 | H$_3$PO$_4$, 85% | 10 |
| NaClO$_3$ | 4 | NaClO$_3$ | 4 |
| Water | 1,000 | Water | 1,000 |
| | | (HOCH$_2$CH$_2$)$_2$NCH$_2$PO$_3$Na$_2$ | 20 |

Two strips of iron (78.8 sq. cm. total surface) were immersed in the above baths at 80°–82° C. for 0.5 hour. The comparative coating weights were:

G.
Solution I _____ 0.0190
Solution II _____ 0.0443

The bath treated with the phosphonate thus shows a coating 2.3 times as heavy as the non-phosphonate bath.

The effect may be used to cut down the immersion time of the metal in the phosphatizing bath required to attain a certain coating weight.

A polymer formed by the fusion of 5 g. maleic anhydride (0.05 mole) with 10 g. diethanolaminomethanephosphonic acid (0.05 mole) for 9 hours at 140° C. gave a clear glass-like and water-soluble product. This resinous product was found to inhibit acid attack on black iron. The iron strips had a total surface area of 81.6 sq. cm. and were completely immersed in the test solutions at room temperature.

TEST #1

| Blank Solution | | Test Solution | |
|---|---|---|---|
| HCl (10%)_____g__ | 250 | HCl (10%)_____g__ | 250 |
| Polymer_____g__ | 0 | Polymer (2%)____g__ | 0.5 |
| I.P.Y._____ | 0.1807 | I.P.Y._____ | 0.0388 |

TEST #2

| | | | |
|---|---|---|---|
| H₂SO₄ (15%)____g__ | 250 | H₂SO₄ (15%)____g__ | 250 |
| Polymer_____g__ | 0 | Polymer (2%)____g__ | 0.75 |
| I.P.Y._____ | 0.3676 | I.P.Y._____ | 0.0908 |

I.P.Y. means inches penetration of metal per year.

The effect of the polymer upon the corrosion rate is quite marked. Naturally larger quantities will give greater protection.

Tests were carried out to show the effectiveness of diethanolaminomethanephosphonic acid for the inhibition of ferric-ion-induced precipitation and dye breakdown in dye baths. Dye solutions containing only a little dye show the iron effects fastest and most visibly; they were prepared with distilled water to 300 ml. total volume containing the following:

| I | | II | | III | |
|---|---|---|---|---|---|
| Dye_____g__ | 0.0183 | Dye_____g__ | 0.0183 | Dye_____g__ | 0.0183 |
| | | Fe_____g__ | 0.0055 | Fe_____g__ | 0.0055 |
| | | | | (HOCH₂CH₂)₂NCH₂PO₃H₂__g__ | 0.05 |
| pH_____ | 2.95 | pH_____ | 2.95 | pH_____ | 2.95 |

The results are tabulated for the dyes tested:

*Table XIV*

| | I | II | III |
|---|---|---|---|
| Basic Fuchsin_____ | clear, colored soln.____ | ppt. | no ppt., color normal |
| Alizarine Cyanone Green G Extra. | ____do_____ | ppt. | most of ppt. dissolves |
| Brilliant Green_____ | ____do_____ | washed out color | color, normal |
| Rhodamine B_____ | ____do_____ | color faded; hazy | no ppt., color normal |
| Solantine Turquoise G. | ____do_____ | ppt. | most of ppt. dissolves; dye color restored |
| Eosine Y_____ | ____do_____ | ppt. | most of ppt. dissolves |

The results show that diethanolaminomethanephosphonic acid is effective in stabilizing the tint and clarity of certain dye baths in the presence of ferric ion.

This application is a continuation-in-part of our co-pending application Serial No. 605,957, filed August 24, 1956, issued as Patent 2,917,528.

The foregoing detailed description has been given for clearness of understanding only, and no unnecessary limitations should be understood therefrom, as modifications will be obvious to those skilled in the art.

We claim:
1. A constituent from the group consisting of:
(a) a compound of the formula:

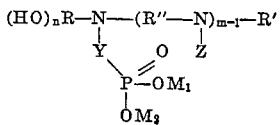

wherein $n$ is a number from 1–3; $m$ is an integer from 1–7; R is a member selected from the group consisting of lower alkyl groups having at least three carbon atoms and poly (lower alkylene ether) groups having terminal lower alkylene substituents; R″ is a lower alkylene group; Y is a member selected from the group consisting of lower alkylene groups and halogenated lower alkylene groups; and R′ and Z are members selected from the group consisting of hydrogen, lower alkyl, monocyclic aryl, lower alkyl substituted monocyclic aryl, $-R(OH)_n$ and $$-Y-P\underset{OM_2}{\overset{O\quad OM_1}{\parallel\diagup}}$$

substituents where $M_1$ and $M_2$ are members selected from the group consisting of hydrogen and salt forming substituents; and (b) chelates comprising the compound of (a) and polyvalent metal ion.

2. A compound of the formula:

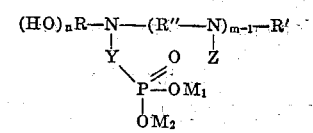

wherein $n$ is a number from 1–3; $m$ is an integer from 1–7; R is a member selected from the group consisting of lower alkyl groups having at least three carbon atoms and poly (lower alkylene ether) groups having terminal lower alkylene substituents; R″ is a lower alkylene group; Y is a member selected from the group consisting of lower alkylene groups and halogenated lower alkylene groups; and R′ and Z are members selected from the group consisting of hydrogen, lower alkyl, monocyclic aryl, lower alkyl substituted monocyclic aryl, $-R(OH)_n$ and $$-Y-P\underset{OM_2}{\overset{O\quad OM_1}{\parallel\diagup}}$$

substituents where $M_1$ and $M_2$ are members selected from the group consisting of hydrogen and salt forming substituents.

3. Chelate comprising a compound of claim 2 and polyvalent metal ion.

4. Water-soluble chelate comprising a compound of claim 2 and ferric iron ion.

5. A compound of claim 2 wherein Y is a methylene group.

6. A compound of claim 2 wherein Y is a methylene group, R′ is $-R(OH)_n$, and $m$ is one.

7. A compound of claim 2 wherein Y is a methylene group, R' is

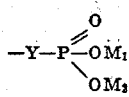

and m is one.

8. A compound of claim 2 wherein Y is a methylene group and R' is $-R(OH)_L$, m is 2, and Z is

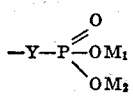

9. A compound of the formula:

$$(HOCH_2)_3\text{-}C\text{-}N\text{-}(CH_2PO_3H_2)_2.$$

10. Metal salt of the compound of claim 9.
11. Water-soluble chelate comprising a member of the group consisting of $(HOCH_2)_3\text{-}C\text{-}N\text{-}(CH_2PO_3H_2)_2$ and salts thereof, and polyvalent metal.
12. Water-soluble chelate of claim 11 wherein the polyvalent metal is a member of the group consisting of cupric and ferric iron ions.
13. A compound of the formula:

$$CH_3(CH_2OH)_2CN(CH_2PO_3H_2)_2.$$

14. Metal salt of the compound of claim 13.
15. Water-soluble chelate comprising a member of the group consisting of $CH_3(CH_2OH)_2CN(CH_2PO_3H_2)_2$ and salts thereof, and polyvalent metal.
16. Water-soluble chelate of claim 15 wherein the polyvalent metal is a member of the group consisting of cupric and ferric iron ions.
17. A compound of the formula:

$$[-CH_2-N-(CH_2CH_2OH)CH_2PO_3H_2]_2$$

18. Metal salt of the compound of claim 17.
19. Water-soluble chelate comprising a member of the group consisting of $$[-CH_2-N-(CH_2CH_2OH)CH_2PO_3H_2]_2$$

and salts thereof, and polyvalent metal.
20. Water-soluble chelate of claim 19 wherein the polyvalent metal is a member of the group consisting of cupric and ferric iron ions.
21. A compound of the formula:

$$(HOCH_2)_3CN[CH_2P(OH_2)]_2$$

22. Metal salt of the compound of claim 21.
23. Water-soluble chelate comprising a member of the group consisting of $(HOCH_2)_3CN[CH_2P(OH_2)]_2$ and salts thereof, and polyvalent metal.
24. Water-soluble chelate of claim 23 wherein the polyvalent metal is a member of the group consisting of cupric and ferric iron ions.
25. A compound of the formula:

$$H(OCH_2CH_2)_3CH_2N(CH_2PO_3H_2)_2$$

26. Metal salt of the compound of claim 25.
27. Water-soluble chelate comprising a member of the group consisting of $$H(OCH_2CH_2)_3CH_2N(CH_2PO_3H_2)_2$$

and salts thereof, and polyvalent metal.
28. Water-soluble chelate of claim 27 wherein the polyvalent metal is a member of the group consisting of cupric and ferric iron ions.
29. A compound of the formula:

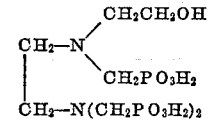

30. Metal salt of the compound of claim 29.
31. Water-soluble chelate comprising a member of the group consisting of

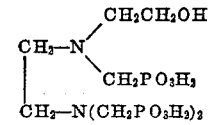

and salts thereof, and polyvalent metal.
32. Water-soluble chelate of claim 31 wherein the polyvalent metal is a member of the group consisting of cupric and ferric iron ions.
33. A compound of the formula:

$$HOCH[CH_2NH(CH_2PO_3H_2)]_2$$

34. Metal salt of the compound of claim 33.
35. Water-soluble chelate comprising a member of the group consisting of $HOCH[CH_2NH(CH_2PO_3H_2)]_2$ and salts thereof, and polyvalent metal.
36. Water-soluble chelate of claim 35 wherein the polyvalent metal is a member of the group consisting of cupric and ferric iron ions.
37. A compound of the formula:

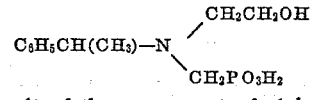

38. Metal salt of the compound of claim 37.
39. Water-soluble chelate comprising a member of the group consisting of

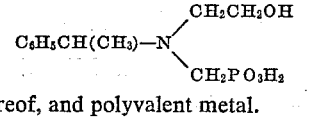

and salts thereof, and polyvalent metal.
40. Water-soluble chelate of claim 39 wherein the polyvalent metal is a member of the group consisting of cupric and ferric iron ions.

References Cited in the file of this patent
UNITED STATES PATENTS 2,227,963    Dickey et al. _____ Jan. 7, 1941